US008661330B1

(12) United States Patent
Kilat et al.

(10) Patent No.: US 8,661,330 B1
(45) Date of Patent: Feb. 25, 2014

(54) AUTOMATIC FIELD ENTRIES BASED ON GEOGRAPHIC LOCATION

(75) Inventors: Kyle Greene Kilat, Mountain View, CA (US); Joseph W. Lasee, Santa Clara, CA (US); Jose A. Alvarez, Sunnyvale, CA (US); Vladimir Magdalin, Citru Heights, CA (US)

(73) Assignee: Intuit Inc., Mountain View, CA (US)

( * ) Notice: Subject to any disclaimer, the term of this patent is extended or adjusted under 35 U.S.C. 154(b) by 816 days.

(21) Appl. No.: 12/372,520

(22) Filed: Feb. 17, 2009

(51) Int. Cl.
*G06F 17/00* (2006.01)

(52) U.S. Cl.
USPC ............................ 715/226; 715/224; 715/225

(58) Field of Classification Search
USPC .................................... 715/221–226; 705/39
See application file for complete search history.

(56) References Cited

U.S. PATENT DOCUMENTS

| 6,651,217 | B1* | 11/2003 | Kennedy et al. ............... 715/224 |
| 6,675,165 | B1* | 1/2004 | Rothschild .................... 707/769 |
| 6,938,022 | B1* | 8/2005 | Singhal ......................... 705/74 |
| 7,996,760 | B2* | 8/2011 | Spork ........................... 715/226 |
| 8,069,073 | B2* | 11/2011 | Shapiro et al. ............... 705/7.14 |
| 2002/0013788 | A1* | 1/2002 | Pennell et al. ................ 707/507 |
| 2002/0026426 | A1* | 2/2002 | Bennett .......................... 705/64 |
| 2002/0165932 | A1* | 11/2002 | Rensin et al. ................. 709/217 |
| 2004/0205526 | A1* | 10/2004 | Borodovski et al. .......... 715/505 |
| 2004/0205618 | A1* | 10/2004 | Sini et al. ....................... 715/523 |
| 2007/0089049 | A1* | 4/2007 | Gormish et al. .............. 715/507 |
| 2007/0157075 | A1* | 7/2007 | Ritter ............................ 715/507 |
| 2008/0109404 | A1* | 5/2008 | Holm ................................ 707/3 |
| 2008/0172357 | A1* | 7/2008 | Rechis et al. ..................... 707/2 |
| 2008/0172598 | A1* | 7/2008 | Jacobsen et al. .............. 715/224 |
| 2008/0313529 | A1* | 12/2008 | Gwozdz et al. ............... 715/224 |
| 2009/0204881 | A1* | 8/2009 | Murthy et al. ................ 715/226 |
| 2010/0174709 | A1* | 7/2010 | Hansen et al. ................ 707/728 |
| 2010/0332354 | A1* | 12/2010 | Eyre ............................ 705/27.1 |
| 2011/0093523 | A1* | 4/2011 | Jaye ............................. 709/203 |

* cited by examiner

*Primary Examiner* — Thu Huynh
(74) *Attorney, Agent, or Firm* — Park, Vaughan, Fleming & Dowler LLP; Steven E. Stupp (57) ABSTRACT

Embodiments of a computer system, a method and a computer-program product (e.g., software) for use with the computer system are described. These embodiments may be used to assist users while they are filling in forms. In particular, based at least in part on a current location of a user (such as a location of a portable electronic device associated with the user), an association with location and non-location information for an entity may be identified. For example, a predetermined relationship between the user's current location and the location of the entity may be accessed. Alternatively, a relationship between the user's current location and the location of the entity may be determined, for example, based at least in part on proximity. This identified location and/or non-location information for the entity may be used to fill in one or more fields in a form associated with an application.

15 Claims, 5 Drawing Sheets

AUTOMATIC FIELD ENTRIES BASED ON GEOGRAPHIC LOCATION

BACKGROUND

The present invention relates to techniques for completing fields in forms based on the geographic location of users.

Many software applications require users to provide information by inputting data into forms. For example, accounting applications provide a wide variety of forms that are used to collect information from users. Unfortunately, filling in such forms can be time-consuming and tedious for users.

To assist users in completing such forms, many software applications use so-called 'smart-fill' techniques. For example, when a user starts to enter information in a field, a software application either completes the field for them (based on entries previously provided by the user) or suggests the remainder of the information to the user. In this way, smart-fill techniques can simplify and improve the user experience.

However, in order for users to benefit from such smart-fill techniques, these users still are required to initiate the process. More specifically, a user has to launch a software application, select an appropriate field in a form (for example, by clicking on the field), and enter in at least a portion of the requested information. Although the smart-fill techniques can improve the user experience, these residual user actions can still be time-consuming and tedious.

SUMMARY

One embodiment of the present invention relates to a computer system that assists a user in completing a form. During operation, the computer system receives information associated with a current location of the user. Then, the computer system identifies an association between the current location of the user and information for an entity, where the information for the entity includes location information and non-location information. Next, the computer system accesses the stored non-location information for the entity, and fills in one or more fields in a form associated with an application using the non-location information for the entity.

In some embodiments, identifying the association involves accessing a predetermined relationship between the current location of the user and the location information for the entity. Alternatively, identifying the association may involve determining a relationship between the current location of the user and the location information for the entity. For example, the relationship may include a proximity of the current location of the user and the location information for the entity. Moreover, the proximity may include distance between the current location of the user and a location specified by the location information for the entity, where the distance is less than a minimum value.

Furthermore, the computer system may also access the stored location information for the entity, and may fill in one or more additional fields in the form using the stored location information for the entity. This form may include an invoice or a sales receipt.

Note that the current location of the user may correspond to a location of a portable electronic device, such as a cellular telephone. This information associated with the current location of the user may be determined, at least in part, using triangulation and/or a global positioning system.

Moreover, the information associated with the current location of the user may be received without an explicit action by the user. For example, the computer system may execute the application prior to receiving the information associated with the current location of the user, and the computer system may provide a request for the information associated with the current location of the user based at least in part on instructions from the application. Alternatively or additionally, the computer system may execute the application after the information associated with the current location of the user is received.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method and a computer-program product (e.g., software) for use with the computer system are described. These embodiments may be used to assist users while they are filling in forms. In particular, based at least in part on a current location of a user (such as a location of a portable electronic device associated with the user), an association with location and non-location information for an entity may be identified. For example, a predetermined relationship between the user's current location and the location of the entity may be accessed. Alternatively, a relationship between the user's current location and the location of the entity may be determined, for example, based at least in part on proximity. This identified location and/or non-location information for the entity may be used to fill in one or more fields in a form associated with an application.

This assistance technique may further reduce or eliminate residual user actions that are needed in existing smart-fill techniques. Consequently, this assistance technique may make it easier for users to use software applications that include forms, thereby increasing customer satisfaction and productivity.

Figure 1:
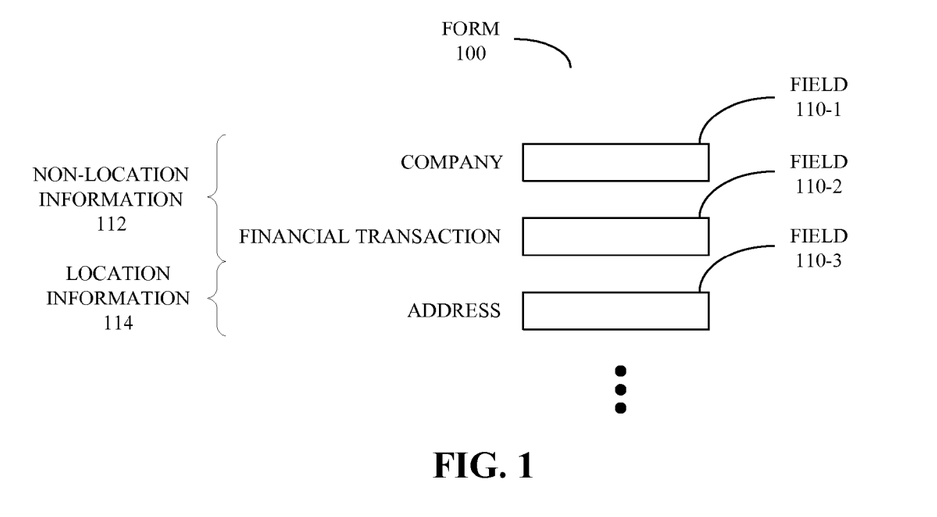
FIG. 1 is a block diagram illustrating fields in a form in accordance with an embodiment of the present invention.

We now describe embodiments of a process for assisting a user in completing a form. FIG. 1 presents a block diagram illustrating fields 110 in a form 100. Users of software applications often provide information by entering information into fields, such as fields 110. Note that the required information in form 100 includes non-location information 112 and location information 114 (such as an address) for an entity, such as a company, an organization and/or an individual.

However, even with smart-fill techniques, it is often tedious for users to repeatedly provide the same information in form 100 for a given entity multiple times. For example, employees of a company may routinely bill the same clients for services that are repeated periodically. Therefore, the employees may need to routinely fill in the same information in invoices or sales receipts. In addition, users often make mistakes when performing such repetitive tasks, even when possible entries are restricted (as is the case with smart-fill techniques), because users may inadvertently select an incorrect entry. Consequently, while existing smart-fill techniques improve the user experience, and thus, overall customer satisfaction with software applications, these solutions are still not ideal from a user perspective.

To address this problem, the geo-location capability (such as cell-based location, triangulation and/or global positioning systems) associated with many portable electronic devices (such as cellular telephones) may be used to initiate the completion of at least some of fields 110 in form 100. In particular, based at least in part on the current location of a user (such as the current location of a portable electronic device associated with the user), stored location and/or non-location information for an entity may be identified. Using this stored location and/or non-location information, at least some of fields 110 in form 100 may be filled in.

Furthermore, to increase user convenience, in some embodiments these operations are performed without an explicit request from the user. For example, based at least in part on the current user location, a software application may be launched and at least some of fields 110 in form 100 may be filled in. Alternatively or additionally, if the user launches the software application, the software application may request the current location of the user. If the current user location is proximate to the location of the entity (for example, if the current user location is within a predetermined distance, such as 10, 50, 100, 500 or 1000 m of the location of the entity), at least some of fields 110 in form 100 may be filled in.

Figure 2:
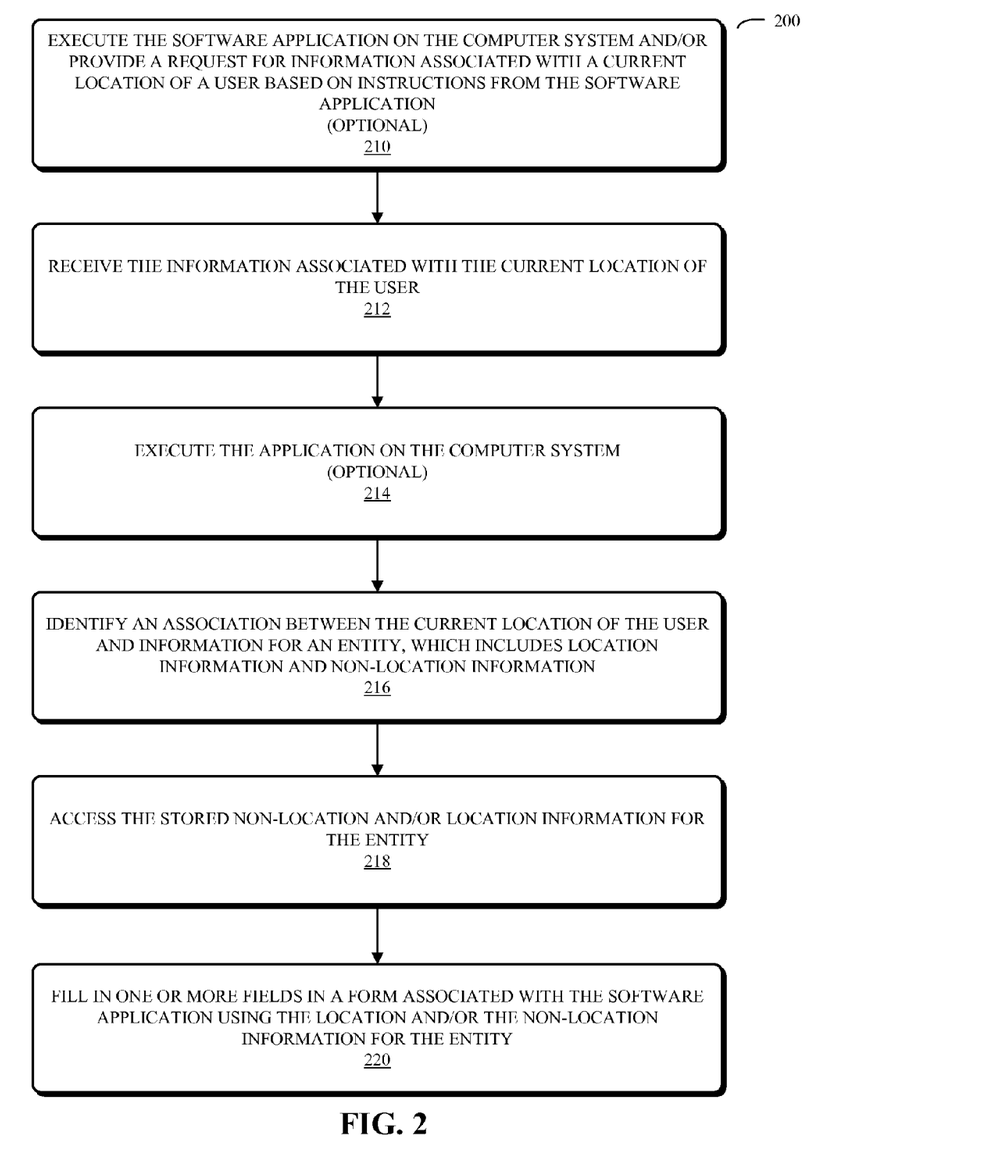
FIG. 2 is a flow chart illustrating a process for assisting a user in completing a form in accordance with an embodiment of the present invention.

FIG. 2 presents a flow chart illustrating a process 200 for assisting a user in completing a form, which may be performed by a computer system. During operation, the computer system may optionally execute a software application prior to receiving the information associated with the current location of the user and/or may provide a request for the information associated with the current location of the user based at least in part on instructions from the software application (210). Then, the computer system receives information associated with a current location of the user (212). In some embodiments, after receiving the information associated with the current location of the user, the computer system optionally executes the software application (214).

Next, the computer system identifies an association between the current location of the user and information for an entity which is stored in a computer-readable medium (216), where the information for the entity includes location information and non-location information. In some embodiments, identifying the association involves accessing a predetermined relationship between the current location of the user and the location information for the entity. Alternatively, identifying the association may involve determining a relationship between the current location of the user and the location information for the entity. For example, the relationship may include a proximity of the current location of the user and the location information for the entity. Moreover, the proximity may include distance between the current location of the user and a location specified by the location information for the entity, where the distance is less than a minimum value.

Moreover, the computer system accesses the stored non-location and/or location information for the entity (218), and fills in one or more fields in a form associated with the software application using the location and/or the non-location information for the entity (220).

In some embodiments of process 200, there may be additional or fewer operations. Moreover, the order of the operations may be changed and/or two or more operations may be combined into a single operation.

In an exemplary embodiment, a remote worker is at or near a location of a particular client and begins to create an invoice or sales receipt. When this worker begins the workflow (e.g., creates a new invoice), financial software may fill in the customer information fields in the invoice with the location and/or non-location information for the client based at least in part on the tracked location of a notebook computer associated with the worker.

Alternatively, after performing a financial transaction in a retail establishment, a customer may enter the financial transaction into financial accounting software via the customer's cellular telephone. Based at least in part on the location of the cellular telephone, the financial accounting software may fill in the store name and location associated with the financial transaction as soon as the customer starts the workflow.

Thus, this assistance technique may determine a 'best guess' for the contents of one or more fields in one or more forms based at least in part on an association between the current location of the user and the stored locations of one or more entities. As noted previously, the association may involve accessing a predetermined relationship, such as when the user is within a minimum distance of a particular entity (such as a client, a vendor, a payee, etc.), and the associated stored location and/or non-location information for the particular entity may be used to complete at least a portion of a form. Alternatively, the relationship may be determined (e.g., while the software application is executing) based at least in part on the current location of the user, for example based at least in part on proximity to the particular entity.

Note that the information entered into the one or more forms includes location and/or non-location information for the one or more entities (as opposed to merely entering in the current location of the user). Also note that this information may be entered into or filled in the one or more forms without an explicit action by the user, such as starting to enter in information into a particular field prior to the user selecting this field or providing any of the information.

Figure 3:
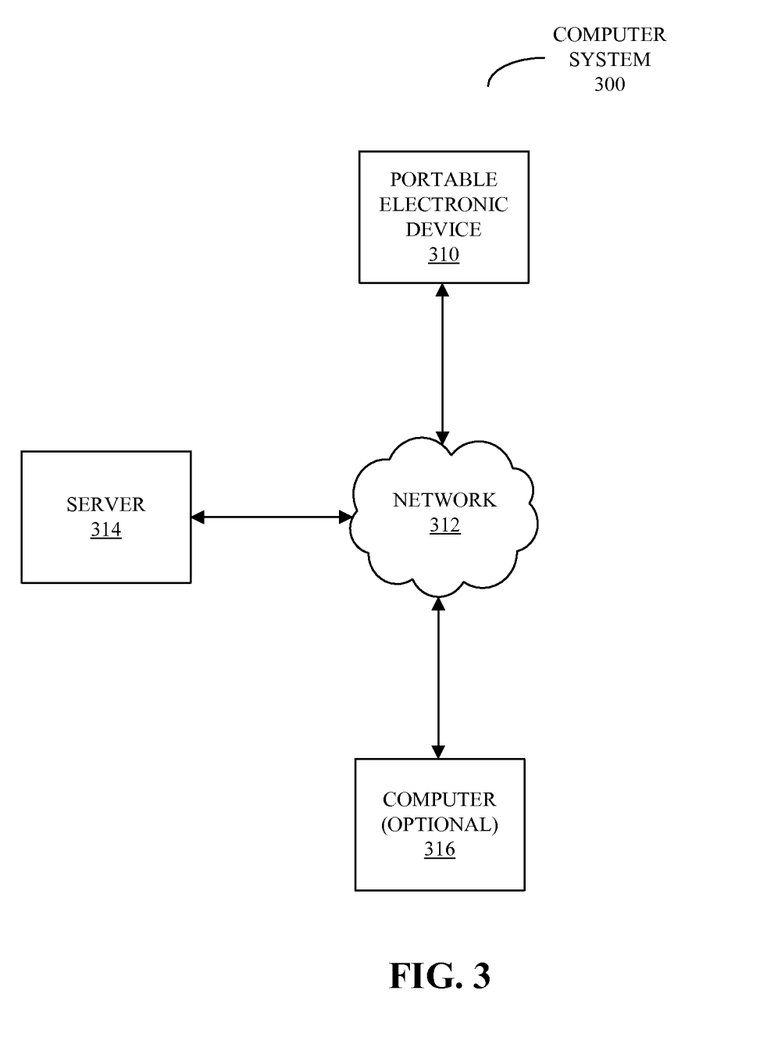
FIG. 3 is a block diagram illustrating a networked computer system that assists a user in completing a form in accordance with an embodiment of the present invention.

We now describe embodiments of a computer system that performs process 200. FIG. 3 presents a block diagram illustrating a networked computer system 300 that assists a user in completing a form. In this computer system, server 314 may receive the current location of portable electronic device 310 (and thus, the associated user of portable electronic device 310) via network 312. For example, portable electronic device 310 may be a cellular telephone, and the current location may be determined based at least in part on: a communication cell in an associated cellular network, triangulation and/or information from a global positioning system.

In some embodiments, the current location of portable electronic device 310 is determined in response to instructions from at least a portion of a software application that is executing on portable electronic device 310. Alternatively and/or additionally, at least a portion of the software application may, at least in part, execute on server 314 and/or on optional computer 316. For example, the software application may be a stand-alone application or a portion of another application. Moreover, in some embodiments, the software application is a software-application tool that is embedded in a web page. In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing. JavaScript, ECMAScript instructions, VBScript instructions, or instructions in another programming language suitable for rendering by the web browser or another client application on portable electronic device 310 and/or optional computer 316.

Based at least in part on the current location of portable electronic device 310, at least a portion of the software application that executes on server 314 associates the current location of portable electronic device 310 with stored location and/or non-location information for an entity. For example, the software application may identify the entity (and the associated stored information) based at least in part on proximity of the current location of the portable electronic device 310 and the stored location for the entity. Alternatively or additionally, a relationship between the current location of portable electronic device 310 and the stored information for the entity may be predetermined, such that when the current location of portable electronic device 310 is received by the software application, the entity is directly identified (as opposed to having the software application search through stored information for multiple entities).

Using the stored information, the software application may fill in one or more fields in one or more forms associated with the software application. For example, the software application may enter the location and/or the non-location information for the entity into an invoice or a sales receipt. The at least partially completed one or more forms may be accessed by the user on portable electronic device 310 and/or subsequently on optional computer 316.

In some embodiments, information for one or more entities, as well as the one or more at least partially completed forms, may be stored on server 314 and/or at one or more other locations in computer system 300 (i.e., locally or remotely). Moreover, because this information may be sensitive in nature, it may be encrypted. For example, stored information and/or information communicated via network 312 may be encrypted.

Computers and servers in computer system 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 may include: the Internet, World Wide Web (WWW), an intranet, LAN, WAN, MAN, or a combination of networks, or other technology enabling communication between computing systems.

In exemplary embodiments, the software application includes financial software, such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
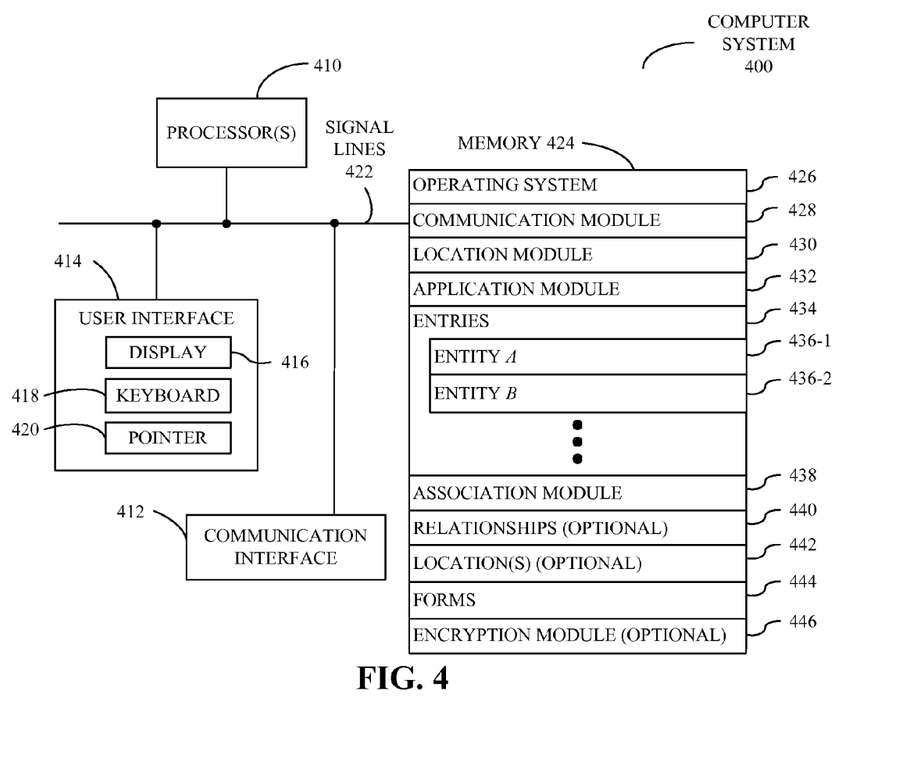
FIG. 4 is a block diagram illustrating a computer system that assists a user in completing a form in accordance with an embodiment of the present invention.

FIG. 4 presents a block diagram illustrating a computer system 400 that assists a user in completing a form. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or sets of instructions), including: location module 430 (or a set of instructions), application module 432 (or a set of instructions), association module 438 (or a set of instructions) and/or optional encryption module 446 (or a set of instructions). Independently or in response to instructions from application module 432, location module 430 may request and receive optional locations 442 for one or more users. For example, a user may launch application module 432, which may request and receive the user's current location. Alternatively, location module 430 may request and receive the user's current location, and based at least in part on the user's current location may launch application module 432.

Association module 438 may associate the user's current location with stored information for one or more entities, such as stored information for entity A 436-1 or entity B 436-2 in entries 434 in a data structure in memory 424. In some embodiments, association module 438 determines a relationship between the user's current location and an entity, such as entity A 436-1. For example, association module 438 may compare the user's current location with stored locations in entries 434 and may identify entity A 436-1 based at least in part on proximity.

Alternatively or additionally, association module 438 may access one or more optional predetermined relationships 440. For example, when the user's current location is received, association module 438 may use optional predetermined relationships 440 to rapidly identify entity A 436-1.

Then, application module 432 may access stored information for entity A 436-1, such as non-location information, which is used to fill in one or more fields in one or more forms 444 associated with application module 432.

As noted previously, in some embodiments, application module 432 is implemented as an application tool embedded in a web page that is rendered by a web-browser module (not shown). In some embodiments, at least some of the information stored in memory 424 and/or at least some of the information communicated using communication module 428 is encrypted using optional encryption module 446.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer systems 300 (FIG. 3) and/or 400 may include fewer components or additional components. Moreover, two or more components may be combined into a single component, and/or a position of one or more components may be changed. In some embodiments, the functionality of the computer system 400 may be implemented more in hardware and less in software, or less in hardware and more in software, as is known in the art.

Figure 5:
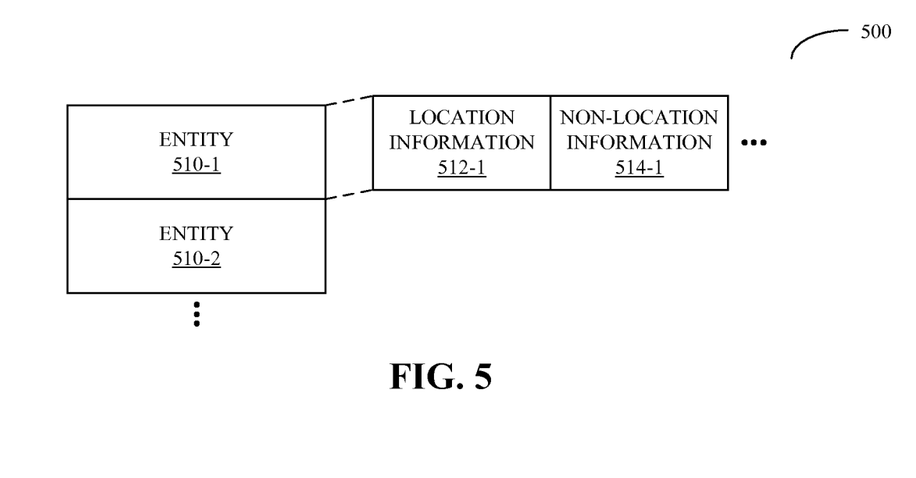
FIG. 5 is a block diagram illustrating a data structure in accordance with an embodiment of the present invention.

We now discuss a data structure that may be used in computer systems 300 (FIG. 3) and 400. FIG. 5 presents a block diagram illustrating a data structure 500. This data structure may include information for one or more entities 510. For example, the information for entity 510-1 may include: location information 512-1 and non-location information 514-1.

Note that in some embodiments of data structure 500 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for assisting a user in completing a form, comprising:
   receiving a current location of the user, wherein the current location is a geographic location, and wherein the user is a service provider;
   determining the distance between the current received location and a location of an entity, wherein the entity is a customer of the service provider;
   in response to determining that the received current location is within a predetermined distance of the location of the entity, automatically launching a financial software application without receiving a request from the user, wherein launching the application involves providing a form to collect information for creating an invoice or a sales receipt for the entity;
   identifying an association between the current location of the user and stored information for the entity, wherein the stored information for the entity includes location information and non-location information;
   accessing the stored non-location information for the entity; and
   filling in, by computer, one or more fields in the provided form using the non-location information for the entity.

2. The method of claim 1, further comprising:
   accessing the stored location information for the entity; and
   filling in one or more additional fields in the form using the stored location information for the entity.

3. The method of claim 1, wherein the current location of the user corresponds to a location of a portable electronic device.

4. The method of claim 3, wherein the portable electronic device includes a cellular telephone.

5. The method of claim 1, wherein the current location of the user is received without an explicit action by the user.

6. The method of claim 1, wherein the current location of the user is determined, at least in part, using triangulation.

7. The method of claim 1, wherein the current location of the user is determined, at least in part, using a global positioning system.

8. The method of claim 1, further comprising executing the software application on a computer system after the current location of the user is received.

9. The method of claim 1 wherein filling in the one or more fields in the provided form further involves populating the fields with at least the name of the entity.

10. A non-transitory computer-readable storage medium storing instructions that when executed by a computer cause the computer to perform a method for assisting a user in completing a form, the method comprising:
    receiving a current location of the user, wherein the current location is a geographic location, wherein the user is a service provider;
    determining the distance between the current received location and a location of an entity, wherein the entity is a customer of the service provider;
    in response to determining that the received current location is within a predetermined distance of the location of the entity, automatically launching a financial software application without receiving a request from the user, wherein launching the application involves providing a form to collect information for creating an invoice or a sales receipt for the entity;

identifying an association between the current location of the user and stored information for the entity, wherein the information for the entity includes location information and non-location information;

accessing the stored non-location information for the entity; and filling in one or more fields in the provided form using the non-location information for the entity.

11. The non-transitory computer-readable storage medium of claim 10, wherein the current location of the user corresponds to a location of a portable electronic device.

12. The non-transitory computer-readable storage medium of claim 10, the method further comprising executing the software application on a computer system after the current location of the user is received.

13. The non-transitory computer-readable storage medium of claim 10 wherein filling in the one or more fields in the provided form further involves populating the fields with at least the name of the entity.

14. A computer system, comprising:
a processor;
memory;
a receiving mechanism configured to receive a current location of the user, wherein the current location is a geographic location, and wherein the user is a service provider;
a determining mechanism configured to determine the distance between the current received location and a location of an entity, wherein the entity is a customer of the service provider;
a launching mechanism configured to automatically launch a software application without receiving a request from the user in response to determining that the received current location is within a predetermined distance of the location of the entity, wherein launching the software application involves providing a form to collect information for creating an invoice or a sales receipt for the entity;
an identification mechanism configured to identify an association between the current location of the user and stored information for the entity, wherein the information for the entity includes location information and non-location information;
an accessing mechanism configured to access the stored non-location information for the entity; and
an entry mechanism configured to fill in one or more fields in the provided form using the non-location information for the entity.

15. The system of claim 14 wherein the entry mechanism is further configured to fill in the one or more fields in the provided form by populating the fields with at least the name of the entity.

* * * * *